United States Patent
Chupp

[15] 3,704,951
[45] Dec. 5, 1972

[54] MULTIPASS LIGHT CELL FOR INCREASING THE INTENSITY LEVEL OF RAMAN LIGHT EMISSION FROM A SAMPLE

[72] Inventor: Vernon L. Chupp, San Dimas, Calif.
[73] Assignee: Cary Instruments, Monrovia, Calif.
[21] Appl. No.: 130,478

Related U.S. Application Data

[63] Continuation of Ser. No. 832,102, June 11, 1969, abandoned.

[52] U.S. Cl. .................. 356/75, 250/218, 356/103
[51] Int. Cl. ............................................. G01j 3/44
[58] Field of Search........356/75, 102, 103, 244, 246; 350/294; 250/218

[56] References Cited

UNITED STATES PATENTS 3,201,709   8/1965   Boyd ...................... 350/294
3,414,354   12/1968  Siegler .................... 356/75

OTHER PUBLICATIONS

Barrett and Adams " Laser-Excited Rotation-Vibration Raman Scattering in Ultra-Small Gas Samples," Journal of the Optical Society of America, Vol. 58, No 3., March 1968, pp. 311– 319.
Herriott and Schulte, " Folded Optical Delay Lines," Applied Optics, Vol. 4, No. 8, August 1965, pp. 883–889.

Primary Examiner—Ronald L. Wibert
Assistant Examiner—Orville B. Chew, II
Attorney—White & Haefliger

[57] ABSTRACT

The invention concerns the use of mirrors and a source of sample exciting light arranged in such relation to a sample zone that source light is caused to pass many times through a sample in that zone for increasing substantially the intensity level of Raman light emission from the sample.

33 Claims, 6 Drawing Figures

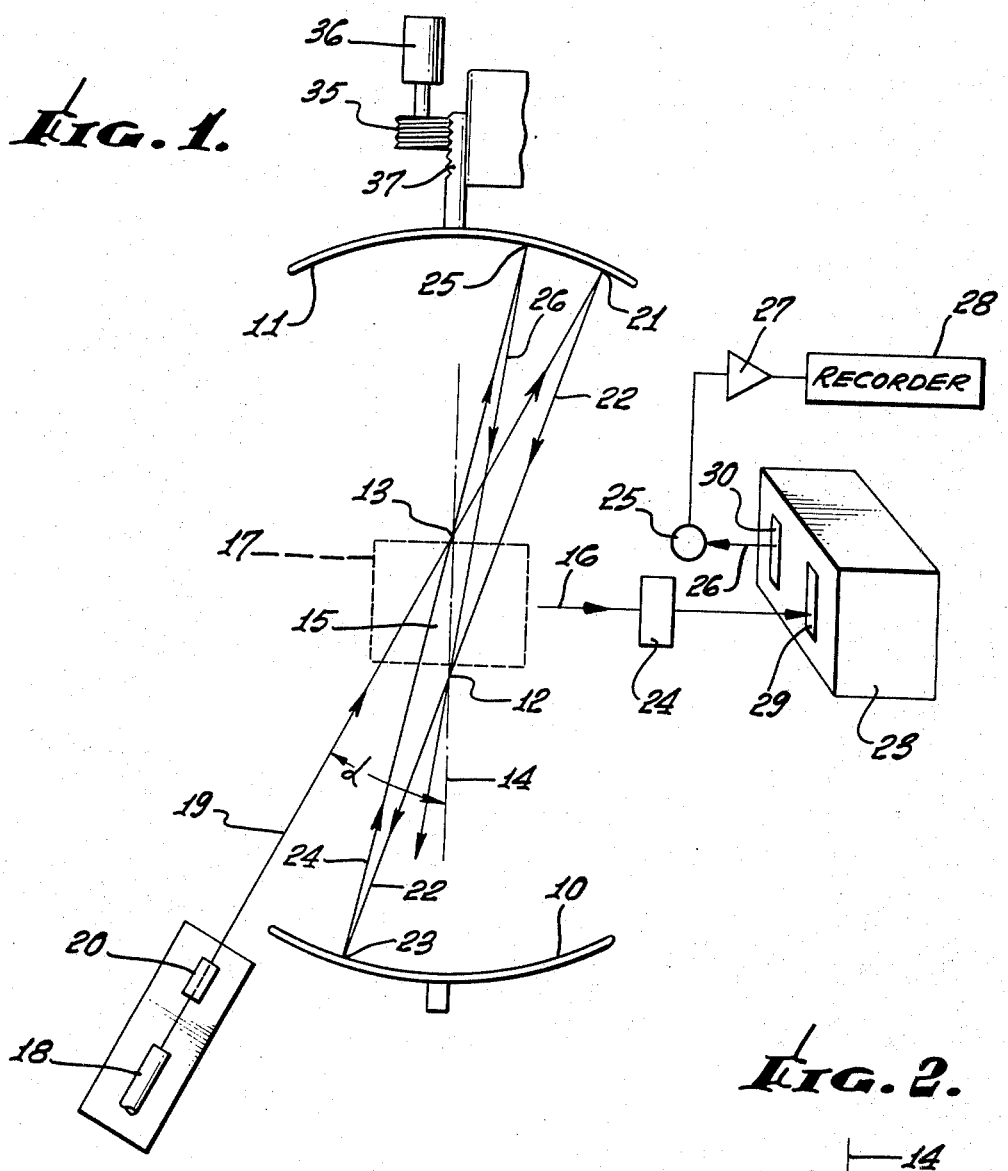

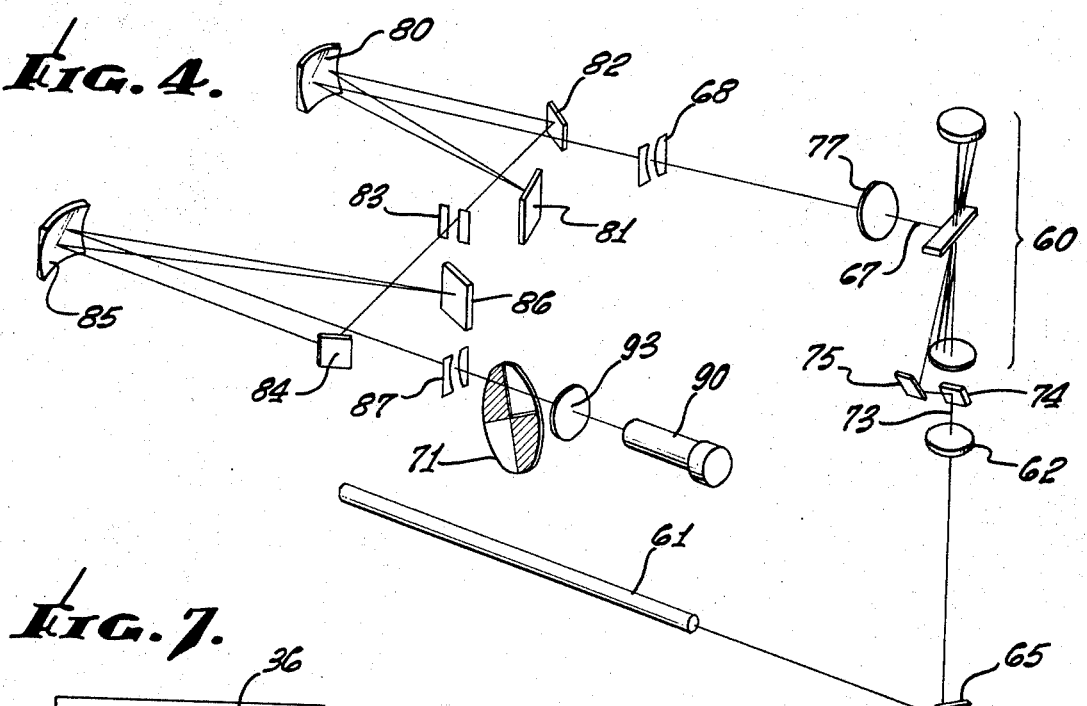
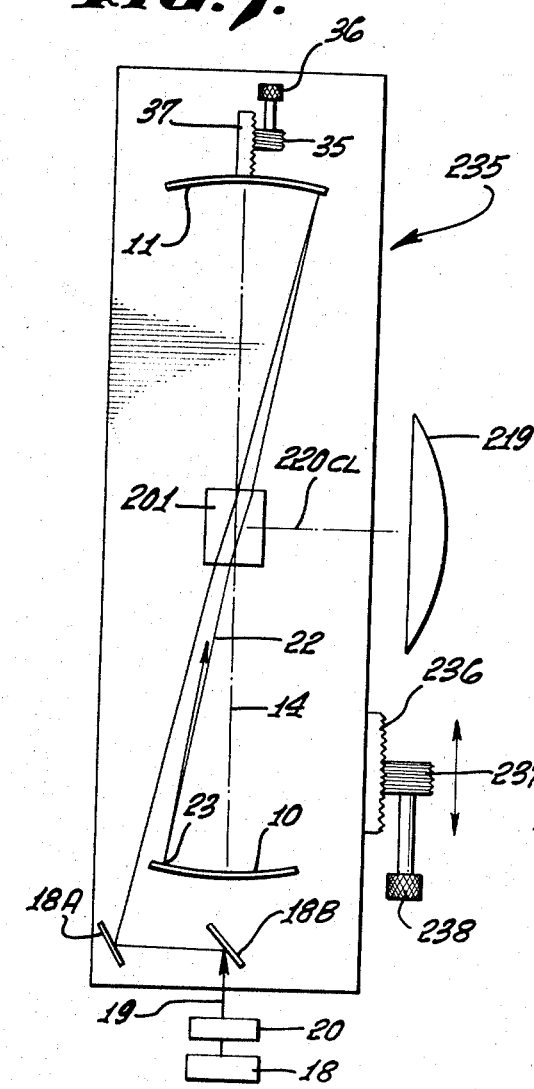
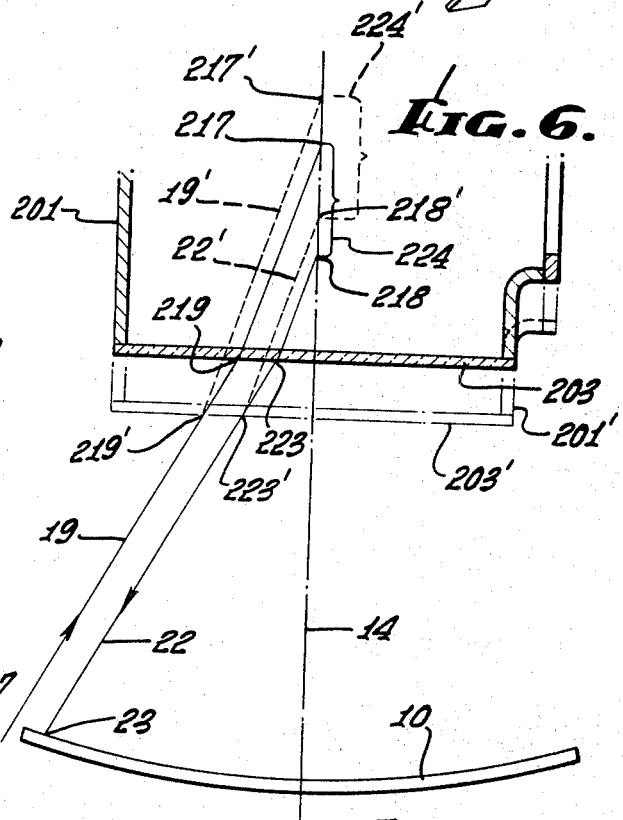
INVENTOR.
VERNON L. CHUPP
By White & Haefliger
ATTORNEYS.

INVENTOR.
VERNON L. CHUPP
By White & Haefliger
ATTORNEYS.

MULTIPASS LIGHT CELL FOR INCREASING THE INTENSITY LEVEL OF RAMAN LIGHT EMISSION FROM A SAMPLE

This is a continuation of spectroscopy, No. 832,102, abandoned.

BACKGROUND OF THE INVENTION

This invention relates generally to spectroscopy, and more particularly concerns enhancement of sample illumination in spectroscopic systems, the invention having a high degree of utility in Raman spectrophotometers.

The Raman effect was observed and identified in 1928 by C. V. Raman while making studies of Rayleigh scattering, the source being sunlight, collected by a telescope and filtered to provide essentially monochromatic radiation. A prism monochromator was used, and Raman lines were observed visually. The early instruments were cumbersome and presented a number of disadvantages. Stable, high intensity sources were not readily available. Few instruments provided good discrimination against Rayleigh scattering of the exciting light. Recordings were photographic, and usually quite time-consuming: some records took days to make. Sample preparation was critical because of instrumental sensitivity to scattering of the exciting light. Operating procedures were often tedious and complicated.

New developments in instrument technology over recent years have minimized the problems associated with early instruments; however, certain problems remain, particularly as respects the difficulty of generating sufficiently intense Raman radiation.

The Raman effect is a type of molecular scattering of light. Scattering of other types usually occurs simultaneously. Scattering due to recoil of photons that collide with molecules in a homogeneous medium is known as Rayleigh scattering, the energy of the photons being changed very little by the collisions, so very little change in wavelength occurs in Rayleigh scattering. Scattering caused by particles suspended in a liquid or gas is known as Tyndall scattering wherein no substantial change in wavelength occurs. Similarly, scratches and other irregularities in or on the cell walls also produce scattering without change in wavelength.

Raman scattering is entirely different from Rayleigh and Tyndall scattering. In the Raman process, photons of excited radiation interact with molecules in such a way that a quantized exchange of energy occurs. The energy and therefore the frequency of the photons is increased or decreased, by amounts corresponding to certain differences in the energy levels of the molecule. For example, assume that the frequency of the exciting radiation is $f_1$, and that a frequency corresponding to a specific difference of energy levels of the molecule involved in the interaction is $f_o$. If such interaction occurs, the photon emitted from the molecule has a different energy corresponding to a different frequency $f_2$. In the interaction, the frequency $f_1$ of the incident photon is changed to a frequency $f_2$ of the scattered photon expressed by the following equation:

$$f_2 = f_1 \pm f_o$$

The positive sign is employed when the incident photon absorbs energy from the molecule, the negative sign when the incident photon loses energy to the molecule. From this expression, it is apparent that a spectrum characteristic of the molecule can be observed in terms of the differences $f_o$ between the frequency $f_2$ of various Raman lines and the frequency $f_1$ of the exciting radiation. Since the energy levels of a molecule are quantized, these frequency differences have a series of discrete values which characterize the different Raman lines. Raman lines do not have fixed frequencies, but rather frequency shifts characteristic of the molecule.

Generally, the frequency differences of Raman lines are the same as the frequencies of lines appearing in the infrared absorption or emission spectrum of the same molecule. However, Raman spectra depend upon polarizability rather than on polarization of the molecule, and thus are subject to different quantum-mechanical selection rules. The effects tend to supplement each other in molecular structure studies. Also, the behavior of the Raman lines excited by polarized light presents valuable additional clues to structure. light and To obtain Raman spectra, a gas, liquid or solid sample is irradiated with monochromatic light. The light scattered from the sample is directed into a monochromator which separates the Raman light from the light resulting from Rayleigh and Tyndall scattering. The Raman light is then directed to a photometer, and its intensity recorded as a function of wavelength to produce a Raman spectrum. It is found that the intensity of the light resulting from Rayleigh and Tyndall scattering of the exciting light is many hundred times the intensity of the Raman light, whereby the problems of separation of the Raman light and detecting same at low intensity levels are present.

SUMMARY OF THE INVENTION

It is a major object of the invention to provide apparatus operable to collect as much Raman light as possible from a very small sample, using a laser for excitation, thereby to increase substantially the intensity level of the Raman light, facilitating its separation from other radiation as well as efficient detection as by means of a photodetector. The invention achieves this purpose through the provision of apparatus wherein the exciting radiation is caused to pass many times through the small sample, and in such manner as eventually to trap the exciting radiation so that it cannot leave the sample or the optical system which produces the trapping effect.

Basically, the invention is embodied in a combination that comprises two longitudinally separated concave mirrors defining two conjugate image points located between the mirrors, which points have relatively close longitudinal spacing in relation to the longitudinal separation of the mirrors along the axis through such points, that axis passing through the sample space adapted to receive a sample (gas or liquid); and means to direct a beam of light, as for example laser light, in such proximity to at least one of the points that the beam is repeatedly reflected by and between the mirrors to pass repeatedly through the sample space. Typically, the mirror surfaces may comprise ellipsoids, with the image points at their foci; alternatively, the mirror surfaces may comprise spherical sections which are easier and less expensive to produce. With the image points located relatively close together, the reflections continue with only slight magnification in each pass; for example, with magnification of 1.15 per pass, up to about 15 passes occurs before the beam becomes so large that collection efficiency diminishes substantially. I have recently found that with magnification of 1.035 at each pass, and including the effects of reflection losses, input ray slope, and aberrations, one can design a cell which makes efficient use of as many as 50 to 100 passes, depending on the monochromator bandwidth and the optics between sample and monochromator. Typically, the path of a central ray of the beam converges by successive reflections to a line defined by the effective system foci.

Another aspect of the invention concerns provision of means for collecting light transmitted from the sample space and comprising a slit having a reduced image located so that the two ends of the image are respectively near the conjugate image points; thus, those points will be imaged near the ends of the slit so that outwardly radiated light is efficiently transmitted into the light collecting or receiving means.

Another object of the invention is to provide for adjustment of the spacing between the mirrors to compensate for differences in the refractive indices of different liquids in the sample space, in order that the reflected beam may repeatedly pass through the conjugate points in conjunction with repeated passage through the liquid sample. Such adjustment may also take into consideration the effect of changes in the exciting-line wavelength.

A further object is to provide a sample cell located between the mirrors in such relation to the conjugate points that the latter are outside the cell; such a cell may have two pairs of windows, one pair having a common center of curvature at one of the conjugate points, and the other pair having a common center of curvature at the other conjugate point as will be seen. Using such a sample cell, it is not necessary to adjust the mirror spacing to compensate for different indices of refraction of sample liquids.

A still further object of the invention is to locate the sample space between the mirrors in such relation to the conjugate image points that the latter are within the sample space. Efficiency is thereby enhanced due to passage of all the light through the sample, and as will be seen, to collect the greatest percentage of the radiation on each particular pass, the foci or image points should be at the sample cell windows, or slightly inside the sample.

Additional objects include the provision of means to adjust the positions of the mirrors, liquid sample cell and light receiving monochromator in such relation as to eliminate error, as will be described.

These and other objects and advantages of the invention, as well as the details of illustrative embodiments, will be more fully understood from the following detailed description of the drawings, in which:

BRIEF DESCRIPTION OF THE DRAWING

FIG. 1 is partly an elevation, partly an isometric, and partly a schematic drawing of an embodiment illustrating the principles of the invention;

FIG. 2 is a view showing a sample holder with image points in the fluid sample;

FIG. 3 is a view showing a sample holder with image points outside the fluid sample;

FIG. 4 is a perspective showing of a system embodying the invention; and

FIGS. 5–7 illustrate modified embodiments of the invention.

DESCRIPTION OF THE PREFERRED EMBODIMENTS

Figure 5:
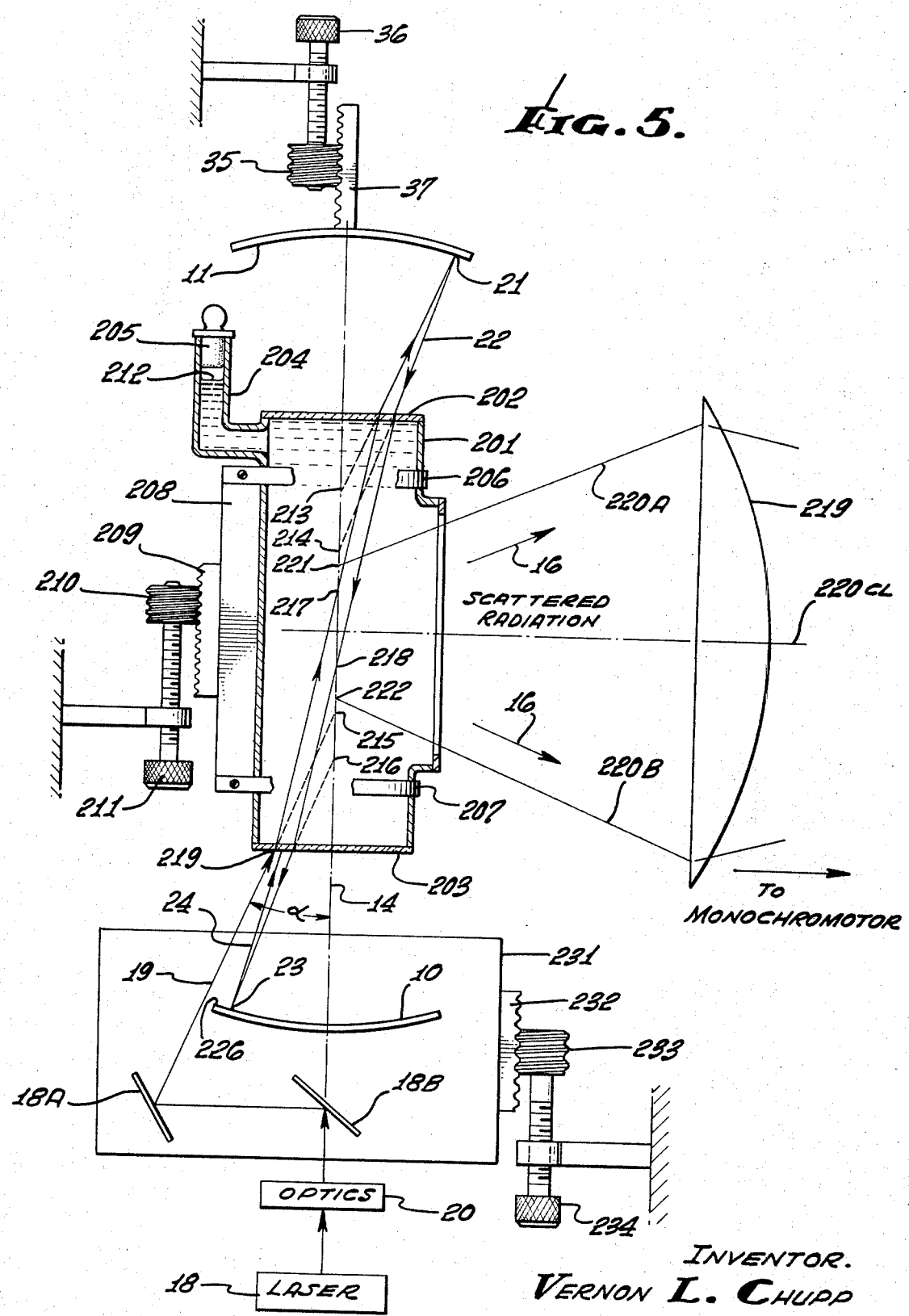

Referring first to FIG. 1, first and second concave reflectors are indicated at 10 and 11 as having longitudinal separation along a line 14 passing through two conjugate image points 12 and 13 defined by the respective reflectors 10 and 11. The reflectors may advantageously comprise ellipsoidal mirrors in which case the points 12 and 13 will be at the foci of such ellipsoids.

As one alternative, one or both of the reflectors may comprise spherical sections, which are easier and less expensive to produce, points 12 and 13 then being conjugate image points related to the locations of the centers of curvature of the spherical sections by certain equations to be presented hereinbelow.

Points 12 and 13 have relatively close longitudinal spacing in relation to the longitudinal separation of the reflectors along the line 14. A sample fluid such as liquid or gas is to be received in whole or in part in the space 15 between the points 12 and 13, in order that light, especially laser light, trapped to pass repeatedly through the sample to result in relatively high intensity level Raman light emission from the sample in the lateral direction 16. The broken lines 17 schematically indicate one disposition of a sample container characterized in that the bulk of the sample extends within and throughout the major length of the space 15 between points 12 and 13, for enhancement of emitted Raman light intensity. As will be seen, one or both points 12 and 13 may be within the sample zone, or outside that zone. FIG. 2 shows points 12 and 13 in the sample zone 150, in cell 151.

The invention also contemplates the provision of means to direct a beam of exciting radiation such as light in such proximity with one of the conjugate image points that the beam is repeatedly reflected by and between the reflectors 10 and 11 to pass repeatedly through the space 15. As one example, a laser is indicated at 18 directing a coherent light beam 19 through an optical system 20 (as for example a lens or lenses) functioning to focus the beam 19 on one of the image points, as for example that point 13 furthest from the optical system 20. Note also the the direction of beam 19 is "off-axis" at an acute angle $\alpha$ relative to the line or axis 14. Beam 19 is reflected at 21 on mirror 11 to pass at 22 through the other image point, as for example point 12 in FIG. 1. Beam 22 is reflected at 23 on mirror 10 to pass at 24 through point 13 for reflection at 25 on mirror 11 as beam 26. The latter passes through point 12 for reflection by mirror 10. As is evident, repeated reflections occur with the light beam converging toward line 14, to give maximum illumination of the zone 15 by "entrapment" of the exciting light. As mentioned previously, some slight magnification will occur upon each reflection; however, if the spacing of points 12 and 13 is minimized, or small, relative to the longitudinal spacing of the mirror surfaces 10 and 11, the resultant magnification effects are minimized and the reflected light can be caused to pass as many as 50 to 100 times through points 12 and 13, and space 15, before the successive magnifications, causing the beam diameter to exceed the width of the slit image and reflection losses at the mirrors, reduce the useable residual light flux to a small fraction of its original level. This number of passes is definitive of a very efficient light collecting cell, as compared with known cells.

A further feature is the provision of means to collect light (as for example Raman light) transmitted at 16 from the sample space. Such means may, for example include a monochromator 23 to which light is directed by the optical system 24. The monochromator functions to disperse the radiation from the illuminated sample, and in so doing to reduce the intensity of undesired background radiation compared with the intensity of the spectral lines being detected, as referred to in U.S. Pat. No. 2,940,355 to H.H. Cary. Note in this connection in FIG. 1 the provision of a photodetector 25 receiving dispersed radiation at 26 from the monochromator, an amplifier 27 connected to the output of the photodetector, and a recorder 28 connected to the output of the amplifier. The photodetector functions to generate an electrical signal corresponding to the intensity of at least a portion (as for example the Raman portion) of the light emitted at 16 from the sample.

For highest efficiency, the spacing of the conjugate image points 12 and 13 as referred to may be so dimensioned in relation to the length of the monochromator entrance slit 29 that the reduce slit image formed at the zone 15 has opposite ends near and preferably close to the points 12 and 13, respectively. Note that the optical system 24 images the long, narrow entrance slit 29 at the gap between image points 12 and 13, and conversely, images the gap between points 12 and 13, at the slit. The monochromator exit slit is designated at 30.

While various mirror separations may be used, the optimum center separation $\Delta C$ of the mirrors, when spherical and of equal radius, is found as follows (for a gas sample):

$$\Delta C = \sqrt{R^2 + (\Delta X)^2} - R \quad (1)$$

where $R$ = radius of curvature of each of the two mirrors
$\Delta X$ = separation of the two conjugate image points.

The separations $\Delta x$ of the two conjugate image points is selected on the basis of the monochromator and other optical system design parameters and optimization considerations, to approximately match the length of the monochromator entrance-slit image in the sample space. The selection of radius of curvature $R$ is somewhat more complicated: The designer would first choose a quantity $M$, the magnification at each pass through the system, by means of trial-and-error analysis of the relationship between overall system efficiency and various system parameters including $M$. Once the magnification per pass is chosen, the radius of curvature of each of the two mirror can be found from the equation, applying only to spherical systems:

$$R = \frac{2M\Delta x}{(M-1)(M+1)} \quad (2)$$

With $\Delta x$ and $R$ evaluated in this way, the optimum center separation $\Delta C$ can be determined in straightforward fashion from equation (1) and the other considerations outlined immediately above.

The spacing of the points 12 and 13 may remain essentially constant as long as the fluid sample to be illuminated as described consists of a gas — with small corrections due to cell-window refraction; in the case of a liquid sample, problems arise having to do with the effects of the different refractive indices as respects different liquids. In this regard, the invention contemplates the provision of compensation for such effects in terms of adjustment of the longitudinal spacing of the mirrors 10 and 11. For example, another feature of the invention concerns the provision of adjustable means operatively connected to at least one mirror or reflector and to the sample cell itself to controllably adjust the relative separation of the mirrors, and the positioning therebetween of the cell, to compensate for the refractive index of sample liquid in that space, so that the reflected beam will repeatedly pass near image points analogous to 12 and 13 in spite of passage through sample liquid.

One arrangement of such adjustable means is shown in each of FIGS. 1 and 5 to include a worm gear 35 driven by manual control 36 and engaging a rack 37 for moving the reflector 11 toward or away from the reflector 10, with precision. A similar combination, comprising knob 211, worm 210, rack 209, movable body 208, and clamps 206 and 207, may be used to control the position of sample cell 201, as indicated in FIG. 5. Cell 201 is typically provided with suitable windows 202 and 203, and with tubular port means 204 and sealing means 205 as shown, whereby the liquid level in cell 201 may be maintained as at 212 above the top of the cell volume proper. In this system, as will be seen, it is advantageously not necessary to provide for adjustment of either the mirror 10 or the angle $\alpha$ of entrance of beam 19, relative to axis or line 14, to compensate for the refractive index of a liquid sample in cell 201.

The bottom portion of the FIG. 5 drawing is similar to that of FIG. 1 — in that beam 19, mirror 10, axis 14, point of impingement of return beam 22, and beam 24, as well as laser 18 and optics 20, are common to both drawings. The points 215 and 216 of FIG. 5 are the virtual positions of the conjugate image points 12 and 13 of FIG. 1 as viewed from the portion of the optical space comprising mirror 10 and optics 20; that is, points 215 and 216 are respectively the points toward which beam 19 appears to be traveling, and from which beam 22 appears to travel to point 23 of mirror 10. Also, the upper portion of the drawing is similar to that of FIG. 1 — in that reflector 11, returning beam 22, and point of impingement 21 of the beam on reflector 11, are common to both drawings. The points 213 and 214 are the virtual locations of the conjugate image points 13 and 12, respectively, as seen from the portion of the optical space comprising reflector 11. Thus, in operation, in the absence of sample cell 201, mirror 11 is adjusted as by operation of knob 36 so that the points 213 and 214 coincide with the points 215 and 216, respectively.

Insertion of a liquid-filled cell 201 into the system when the latter is in the condition represented in FIG. 1 results in the return beam 22 failing to strike mirror 10 at point 23, due to deflection of the beam by refraction at the various points such as 219 in FIG. 5; in fact, if the system is initially adjusted correctly so that point 23 is very near to the edge 226 of reflector 10, the return beam 22 will actually miss mirror 10 entirely, being returned along a path to the left (from the point of view of a person viewing FIG. 5) of the edge 226.

To maintain the conjugate image relationships of the entire system, it is desirable that the return beam 22 impinge at precisely the same point 23 as selected in the absence of cell 201, and shown in FIG. 1. I have found that this can be accomplished in such a way that the paths followed by beam 19 from the laser toward the sample, and by beams 22 and 24 traveling via point 23 between the sample and reflector 10 and back to the sample, are roughly the same as those paths followed in the absence of a sample as in FIG. 1; and further in such a way that the paths followed by beams 19 and 22 traveling between the sample and reflector 11 and back toward the sample, are roughly the same — with respect to reflector 11 — as those paths followed by the said beams in the absence of a sample in cell 201, as in FIG. 1.

This can be accomplished with the apparatus illustrated, as follows: When liquid-filled cell 201 is placed in the beam, return beam 22 will fail to strike reflector 10. The knob 36 is then manipulated to move reflector 11 upwards until the return beam 22 is again observed to impinge on mirror 10 at edge 226. The knob 36 is then further manipulated just until the entire return beam cross-section is seen to be collected by mirror 10. This uniquely defines the position at which the several refractions bring the beam paths at both mirrors into coincidence, relative to the mirrors, with their original paths before cell 201 was installed. The optical space within the cell is now in effect elongated vertically by the refractive action of the sample in cell 201, the incoming beam 19 now intersecting axis 14 at point 217, and return beam 22 now intersecting axis 14 at point 218; these two points will in fact be points of intersection for subsequent beam central rays such as 24 in FIG. 5, in the same way that points 12 and 13 form such intersections in the absence of liquid-filled cell 201. The distance between points 217 and 218, the new conjugate image points, is accordingly somewhat longer than that between points 12 and 13 in FIG. 1; in fact, the elongation of this critical space will be in proportion to the index of refraction of the liquid in the cell.

The cell 201 is then to be adjusted vertically so that true conjugate image points 217 and 218 are approximately centered with respect to nearby ends 221 and 222 of the monochromator entrance-slit image in the sample space, as defined by the passage of limiting rays 220A and 220B from the monochromator via optics including lens 219. Scattered radiation is then transmitted as indicated generally at 16 in FIG. 5, and within the envelope defined by limiting rays 220A and 220B of the slit image, to the monochromator and detection system. This adjustment may be accomplished by means such as illustrated at 208, 209, 210 and 211, manually operated by the operator of the instrument to maximize the instrument response to the optical signal. It is here assumed that lens 219 and the downstream optics are fixed in position relative to the laser 18 and fixed optics 20, and the cell is adjusted with respect to those fixed elements, by the maximization procedure just described, so that the points 217 and 218 are symmetrically disposed about the nominal center line 220CL of the entrance-slit image in the sample space.

If the positions of the reflectors 10, 18A and 18B with respect to the center line 220CL are properly chosen by the designer so that this symmetrical disposition condition is satisfied when the cell is filled with a liquid of typical or median index of refraction with respect to the range of refractive indices anticipated, only small positional adjustments of cell 201 by manipulation of knob 211 will be required in principle, and in practice no adjustments at all will be necessary.

The principle used in producing motion of the intensely illuminated volume volume between conjugate points 217 and 218 by vertical adjustment of the cell 201 is illustrated in FIG. 6, which is an enlarged representation of the lower central portion of FIG. 5. As in FIG. 5, the points 217 and 218 of FIG. 6 are the true conjugate image points through which entering ray 19 and first return ray 22 pass, under the influence of refractions at points 219 and 223 along window surface 203, and at analogous points along the far surface of window 202 of FIG. 5, when the cell 201 and the window 203 are in the position indicated in FIG. 6 by the solid lines. When cell 201 and window 203 are displaced to respective positions 201' and 203', shown dashed, so that refraction of beam 19 occurs at lower point 219', the refraction being along a path 19' indicated by a dashed line parallel to the original path within the liquid beam 19, the beam will now cross axis 14 at elevated point 217'. Similarly, returning beam 22 will have traveled from elevated point 218' for refraction at lower point 223', whence its path coincides with the original path of beam 22 to point 23 on mirror 10. The intensely illuminated volume indicated at 224, between points 217 and 218, is thus displaced upward to zone 224' by the downward displacement of sample-filled cell 201 and window 203.

Consideration of FIGS. 5 and 6 reveals that if the center line 220CL is initially midway between points 215 and 216, that is if the system is aligned for efficient collection of energy from samples having index of refraction very nearly unity i.e., gases), it will not be possible to manipulate cell 201 vertically to move points 217 and 218 to a symmetrically disposed condition relative to line 220CL without placing point 218 at or below the outer window surface 203. This is not a serious limitation, because the system is intended primarily for use with liquids, whose indices are generally 1.2 and above. However, if it is desired to eliminate this limitation, reflectors 10, 18B and 18A may be mounted as shown in FIG. 5 to movable guided carriage 231, provided with rack 232, worm 233 and adjustment knob 234, to permit displacement of points 215 and 216 upward to a symmetrically disposed position with respect to center line 220CL, so that the system may be operated with gaseous samples. However, it should now be noted that system 208 through 211 and system 231 through 234 have somewhat overlapping functions, as both serve to displace the conjugate image points vertically with respect to the collecting optics center line 220CL.

An alternative arrangement which eliminates this redundance is shown in FIG. 7: here the mirrors 10, 18A and 18B and the cell 201, as well as knob 36 and worm 35, are mounted to a guided movable carriage 235, which is in turn manipulable as by rack 236, worm 237 and knob 238, for vertical displacement of this entire subsystem relative to center line 220CL; mirror 11 is in turn manipulable with respect to carriage 235 by operation of knob 36 to actuate worm 35 and rack 37 fixed to mirror 11. With this system, (1) mirror 11 is first adjusted, with or without liquid in cell 201, to direct return ray 22 to the correct point 23 on mirror 10; (2) the entire assembly consisting of carriage 235 and the components mounted thereon is next adjusted vertically by manipulation of knob 238 to accurately center the conjugate image points with respect to the center line 220CL. In this latter adjustment, carriage 235 moves parallel to axis 14, which coincides with the projection of the path of incidence of beam 19 between optics 20 and reflector 18B; in this way the earlier adjustment is preserved while the entire system is translated.

Throughout the preceding discussion, and the quantitative analysis which follows herebelow, the effects of the cell windows, in modifying the refractive properties of the liquid-filled cell, have been neglected. This is completely justified only when the index of refraction of the cell windows happens to match that of the liquid within the cell. However, in practice the introduction of this additional set of considerations only complicates discussions such as the above, without in any way increasing the validity of the conclusions thereof or the utility of systems such as described therein. In quantitative analysis, the effects of the windows are of course felt, but since the range of refractive indices anticipated for liquid samples to be used in my apparatus includes the refractive index of materials suitable for use as cell windows, the algebraic sign or the direction of the window effect, as a perturbation on the quantitative analysis carried out neglecting the window effect, is indeterminate — and the calculations carried out assuming that the window and sample have identical indices are "as good as any."

As will be seen from the following the optimum center separation of the mirrors 10 and 11 depends on the index of refraction of the sample; consequently, as already described, adjustments are desirable to compensate for refractive effects, and only the range of "optimum center separation" need be taken into account in designing the mounting and adjustment apparatus. However, the maximum value of optimum center separation must be taken into account when selecting the length of the cell itself, and may be calculated as follows:

The optimum center separation $\Delta C$ of the mirrors, when spherical and of equal radius, is defined as follows, for a liquid sample:

$$\Delta C = \sqrt{R^2 + (\Delta x)^2} - R + \frac{P(n-1)}{n} \quad (3)$$

where
$P$ = length of path of the light travel through the sample (each pass)
$\Delta x$ = separation of the two conjugate image points in air
$R$ = radius of curvature of each mirror
$n$ = refractive index of sample liquid.

This equation is then used in exactly the same way as equation (1) but now taking account of the liquid path length and index.

Note that $\Delta x$ and $P$ do not have to be the same, as one can place the conjugate image points inside the sample, as for example a 10 millimeter diameter sample, and an 8 millimeter separation of image points. to collect the greatest percentage of radiation on each particular light pass, the image points should be at the sample holder windows, or slightly inside the sample.

Assuming infinitesimal image and object points, it is possible to shape the end windows of a cell in such a way that the indices of refraction of the cell and the liquid in it have little or no effect on the focusing properties. FIG. 3 illustrates the special cell or sample holder 40 for this purpose. The center of curvature of surface 41, one of the cell half-windows, is at image point 42. The radii of surface 41 and surface 43 which are windows, differ by the cell thickness. The laser light beam 44 passes through the cell without deviation by surfaces 41 and 43 and is reflected by mirror 45 at 46. The reflected beam 47 passes through the cell windows or surfaces 48 and 49 without deviation, those windows having a center of curvature at image point 50. Upon reflection by mirror 51 at 52, the reflected beam 53 passes through the cell windows without deviation and through point 42, etc. Thus, neither the windows (as for example glass) nor the refractive liquid affect the focal properties, and the points 42 and 50 may have the same spacing for sample liquids of different refractive indices.

Finally, FIG. 4 illustrates the use of the reflector device of the invention, designated at 60, in an optical system defining a complete spectrophotometer.

The laser 61 mounts on a rigid frame attached to the main instrument. The laser beam is reflected at 65 and then passes through the narrow band filter 62 to reduce interference from gas emission lines. Some light reflected from the filter may be directed to a reference phototube as is common in the art. The main beam 73 enters the entrance optics compartment and is turned by the mirrors 74 and 75. The beam then enters the sample in device 60, and Raman radiation is directed in a lateral beam 67.

Raman light from the sample cell is directed by lens 77 through the monochromator entrance slit 68 to collimating mirror 80 within the first monochromator section. The beam is there reflected to grating 81, back to collimator 80, and then reflected by mirror 82 through intermediate slit 83 to the second monochromator section. From 83 it is reflected by mirror 84 and the second collimator 85 to the second grating 86, back to collimator 85, and then through exit slit 87. The beam is chopped at 71 and focused at phototube 90 by means of lens 93. The phototube signal may be compared to a reference signal in the usual way.

Observations and calculations show that, due to spherical aberration at the mirrors and windows, there is a very slow migration of the conjugate image points outward and then inward along the system axis, for successive passes. For example, in one optimized design the image points in 15 passes move outward nearly to the windows of a 10-mm-tall cell; then back toward their original positions, and past their original positions to the center of the system by the 34th pass; the image points continue migration in the same direction, so that the upper and lower points are actually reversed, and again attain their original spacing but in reversed orientation after a total of some 68 passes. At the same time the beam central ray, rather than converging monotonically to the axis, "walks" or migrates away from and toward the axis in a fashion corresponding very generally to the conjugate-point migration.

If this behavior were deleterious to system performance — and it is not — it could be reduced and substantially eliminated by using ellipsoidal mirrors rather than spherical, and by imparting suitable power to the cell windows to minimize aberrations arising at the planar window surfaces.

However, the migration of conjugate points, and beam impingement points at the reflectors, far from being disadvantageous, can be turned to advantage in various ways. For one thing, the magnification at each pass becomes "minification" or reduction of image size when the conjugate image points reverse positions; this reduces to some extent the rate at which the beam size at succeeding passes approaches and then exceeds the size of the optical elements — this being one of the principal effects which limit the number of useful passes. It is also possible to use the migration of the beam to concentrate the first 20 or 25 passes in a tighter geometric relation, whereby efficient illumination can be "traded off" against sample-cell size and therefore required sample volume, as desired. This constitutes another advantage implied by the spherical aberrations.

Consequently, correction of aberrations will not generally be deemed necessary, but may be desirable for certain applications.

I claim:

1. In spectrometer apparatus for measuring light scattering, the apparatus including a sample holder defining a sample space and operable to pass light repeatedly through a sample in said space, the combination comprising a. two longitudinally separated concave mirrors defining two conjugate image points located between the mirrors, said points being conjugate image points for each of the two mirrors, said points having relatively close longitudinal spacing in relation to the longitudinal separation of the mirrors along an axis through the points, said axis passing through said sample space, and said sample space being sized to receive a sample and located substantially directly between said points, and b. means to focus a beam of light in such proximity to one of said points that the beam is reflected repeatedly by and between the mirrors forming an array of reflections lying substantially in a plane with successive reflections from each mirror passing through said space to the image point closer to the other mirror and thence to the surface of that other mirror.

2. The combination of claim 1 wherein said mirrors are ellipsoids, and said points are at the foci of said ellipsoids.

3. The combination of claim 1 wherein said mirrors are spherical sections.

4. The combination of claim 1 also comprising means for collecting light emitted from said sample space in response to said repeatedly reflected beam.

5. The combination of claim 4 wherein said last named means comprises a slit having a reduced image located so that the two ends of said image are respectively near said conjugate image points.

6. The combination of claim 4 wherein said means for collecting light includes a monochromator having an entrance slit, and including a sample cell defining said space.

7. The combination of claim 6 including means to adjust the position of said cell longitudinally relative to at least one of said mirrors so that light transmitted from said space is directed in generally central alignment with said entrance slit.

8. The combination of claim 6 including means to adjust the position of one mirror longitudinally relative to the other mirror.

9. The combination of claim 6 including means to adjust the positions of said mirrors and cell as a unit and longitudinally relative to a generally lateral axis passing through said entrance slit.

10. The combination of claim 9 including means to also adjust the position of one mirror longitudinally relative to the other mirror.

11. The combination of claim 1 wherein said means is located to direct the beam at a small angle relative to said axis.

12. The combination of claim 1 including said sample in said space.

13. The combination of claim 12 wherein the sample consists of a gas.

14. The combination of claim 12 wherein the sample consists of a liquid.

15. The combination of claim 14 wherein said light directing means is located to direct the beam at a small angle relative to said axis, and including means to vary the angularity of entrance beam direction relative to said axis in conjunction with adjustment of mirror separation.

16. The combination of claim 1 including adjustable means operatively connected to at least one mirror to controllably adjust the relative separation of the mirrors to compensate for the refractive index of sample liquid in said space, so that the reflected beam repeatedly passes through displaced conjugate points within said sample liquid.

17. The combination of claim 1 wherein said sample space is located between the mirrors in such relation to such displaced conjugate points that such points are within the sample space.

18. The combination of claim 1 wherein said means comprises a light source.

19. The combination of claim 18 wherein said source comprises a laser.

20. The combination of claim 19 including means to collect Raman light emitted from a sample in said space.

21. The combination of claim 1 wherein said sample space is defined by a sample cell located between the mirrors in such relation to the conjugate points that the points are outside the cell and the cell is located directly between said conjugate points.

22. An optical system including a sample holder defining a relatively small sample space and operable to cause a beam of radiation to undergo multiple passage through said small space, comprising:

first and second concave reflectors mutually juxtaposed to define first and second effective foci of said system, said first effective focus being nearer said first reflector and said second effective focus being nearer said second reflector, said space being located proximate a line interconnecting said foci;

means to project such beam to said first effective focus;

said first reflector being positioned to intercept and redirect said beam and along a path passing through said space and said second effective focus; and said second reflector being positioned to intercept said redirected beam and to redirect said beam and along a path passing through said portion of said space and said first effective focus;

whereby said beam is reflected repeatedly and successively from the surface of each reflector to the effective focus nearer the the other reflector and thence to the surface of the other reflector with successive reflections forming an array lying substantially in a plane.

23. The system of claim 22, wherein said effective system foci are spaced apart by a distance which is a small fraction of the spacing between said reflectors.

24. The system of claim 22, wherein the path of a central ray of said beam converges by successive reflections to a line defined by said effective system foci.

25. In a spectrometer system for measuring light scattering, a pair of substantially opaque, concave, reflecting surfaces spaced apart and facing each other, and each defining a center of curvature, the surfaces also defining two conjugate image points which are conjugate image points for each mirror and which define a straight line in which said centers of curvature also lie.

said centers being spaced apart by a distance which is small relative to the spacing of said surfaces;

means for projecting light onto one of said surfaces;

said surfaces being disposed so as to reflect said light as successive reflections back and forth through the intervening space a multiplicity of times, the successive reflections converging toward said line and forming an array lying substantially in a plane;

means for supporting a specimen in such relation to said space that successive reflections pass repeatedly through the specimen;

means for receiving light radiated outward from said space as a result of said multiplicity of reflections through said space, said radiated light traveling substantially laterally relative to the paths of said multiplicity of reflections; and photoelectric means located to intercept said received light, and to generate an electrical signal corresponding to the intensity of at least a portion of said light.

26. The combined elements of claim 25, wherein:

said receiving means comprises a monochromator having an entrance slit and an exit slit; and said photoelectric means receives a substantially monochromatic light beam from said exit slit and generates electrical signals in response thereto;

and also:

means for imaging said entrance slit proximate said centers; and means responsive to said signals for indicating the relative intensity of said beam.

27. The combined elements of claim 25, wherein said receiving means comprises a relatively long and narrow aperture; and also optical means for forming along a line joining said centers an image of said aperture;

whereby said outward-radiated light is relatively efficiently transmitted into said receiving means.

28. A system for producing intense illumination of a volume, comprising:

a pair of substantially spherical concave mirrors;

means for supporting said mirrors so that they face one another, spaced apart along a line which includes a normal to the surface of each mirror, and with their respective centers of curvature separated along said line by a distance which is a small fraction of the separation of said surface along said line; and means for projecting a beam of light to pass the outer periphery of one mirror and enter the space between the mirrors to cross said line and impinge upon the other of said mirrors;

the mirrors characterized in that repetitive and successive reflection of said beam between said mirrors and across said line occurs to converge toward said line with successive reflections forming a substantially planar array;

said system including said volume defined by a sample holder located to receive and repeatedly pass a substantial number of successive reflections of said beam during said repetitive reflection thereof.

29. A system for illuminating a space, comprising:

two substantially spherical concave reflecting surfaces;

means for disposing said surfaces in mutually exposed orientation and so that their separation along a line normal to both surfaces is slightly larger than the sum of the two radii of curvature of said surfaces; and means for projecting a beam of light to cross said line and impinge upon one of said surfaces for multiple reflection in a substantially planar array between said surfaces and passage of successive reflections through a sample space confined proximate said line;

said system including a sample holder defining said sample space between said surfaces.

30. The system of claim 29, also comprising means for positioning a sample along said line, whereby the volume occupied by said sample constitutes such a space.

31. An optical system defining a relatively small sample space and operable to cause a beam of radiation to undergo multiple passage through said small space, comprising:

first and second concave reflectors mutually juxtaposed to define first and second conjugate image points of said system, said first image point being nearer to said first reflector than to the second reflector and said second image point being nearer to said second reflector than to the first reflector;

a sample holder defining said space between said image points;

means to project such beam to said first image point;

said first reflector being positioned to intercept and redirect said beam and along a path passing through said space and said second image point; and said second reflector being positioned to intercept said redirected beam and to redirect said beam and along a path passing through said space and said first image point;

said sample space being defined by a sample cell, the reflectors and cell characterized as causing migration of said image points to pass each other along a line passing therethrough and after repeated reflections of said beam.

32. In an optical system for determining the light scattering properties of a sample:

light collecting apparatus having a beam axis passing from said sample toward a light sensing device, two concave mirrors facing each other with said sample in a space between said mirrors, means projecting a beam of exciting light passing near one of said mirrors and falling on the other mirror, said mirrors having orientation characterized in that the beam passes repeatedly and successively between the mirrors and through said space, forming thereby a narrow array of beams lying substantially in a plane, said axis lying substantially in said plane and approximately at 90° to said array of beams, and a sample holder forming said space between two centers of curvature defined by the mirrors, said centers of curvature being closely spaced relative to the separation of the mirrors along a line containing said centers.

33. In apparatus operable to pass laser light repeatedly along paths traversing a sample, and means to collect scattered light in a collection beam emanating from the sample, the combination comprising:

a pair of mirrors having concave surfaces facing each other, the sample lying in a sample space between the mirrors, and means to pass the exciting light between said mirrors and through said sample so that it forms an array of beams on repeated reflection between the mirrors, and successive reflected beam passage through the sample, said array lying substantially in a plane;

said collection beam having an axis also lying in said plane, said space formed by a sample holder and between two centers of curvature defined by the mirrors, said centers of curvature being closely spaced relative to the separation of the mirrors along a line containing said centers.

* * * * *